(12) United States Patent
Banerjee et al.

(10) Patent No.: US 11,131,753 B2
(45) Date of Patent: Sep. 28, 2021

(54) METHOD, APPARATUS AND COMPUTER PROGRAM FOR A VEHICLE

(71) Applicant: Bayerische Motoren Werke Aktiengesellschaft, Munich (DE)

(72) Inventors: Koyel Banerjee, San Jose, CA (US); Dominik Notz, Belmont, CA (US); Johannes Windelen, Mountain View, CA (US)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/780,337

(22) Filed: Feb. 3, 2020

(65) Prior Publication Data

US 2020/0174130 A1    Jun. 4, 2020

Related U.S. Application Data

(63) Continuation of application No. PCT/EP2018/056799, filed on Mar. 19, 2018.

(30) Foreign Application Priority Data

Aug. 4, 2017  (EP) .................................... 17184869

(51) Int. Cl.
    *G01S 7/48*        (2006.01)
    *G06T 7/80*        (2017.01)
    (Continued)

(52) U.S. Cl.
    CPC ............ *G01S 7/4808* (2013.01); *B60R 11/04* (2013.01); *G01S 7/497* (2013.01); *G01S 17/86* (2020.01);
    (Continued)

(58) Field of Classification Search
    CPC ...... G01S 17/86; G01S 17/931; G01S 7/4808; G01S 7/497; G01S 17/89; G06T 7/80; G06T 7/55; G06T 7/13; G06T 7/33; G06T 2207/10024; G06T 2207/10028; G06T 2207/20221; G06T 2207/30252; B60R 11/04; B60R 2011/004; G05D 1/0248;
    (Continued)

(56) References Cited

U.S. PATENT DOCUMENTS 9,369,689 B1 * 6/2016 Tran ...................... G01S 7/4972
9,476,983 B2 * 10/2016 Zeng ....................... G01S 17/87
(Continued)

FOREIGN PATENT DOCUMENTS

CN    106043169 A    10/2016

OTHER PUBLICATIONS

Ji Zhang et al., Visual—Lidar Odometry and Mapping: 2015 IEEE, (ICRA) Seattle, Wa, (Year: 2015).*
(Continued)

*Primary Examiner* — Dramos Kalapodas
(74) *Attorney, Agent, or Firm* — Crowell & Moring LLP (57) ABSTRACT

A method for a vehicle obtains camera sensor data of a camera of the vehicle. The method further obtains lidar sensor data of a lidar sensor of the vehicle. The method determines information related to a motion of the vehicle. The method determines a combined image of the camera sensor data and the lidar sensor data based on the information related to the motion of the vehicle.

19 Claims, 6 Drawing Sheets

(51) Int. Cl.

| | |
|---|---|
| *G06T 7/55* | (2017.01) |
| *G06T 7/13* | (2017.01) |
| *G06T 7/33* | (2017.01) |
| *G01S 17/86* | (2020.01) |
| *B60R 11/04* | (2006.01) |
| *G01S 7/497* | (2006.01) |
| *G01S 17/89* | (2020.01) |
| *G05D 1/02* | (2020.01) |
| *H04N 5/04* | (2006.01) |
| *B60R 11/00* | (2006.01) |

(52) U.S. Cl.
CPC ............ *G01S 17/89* (2013.01); *G05D 1/0248* (2013.01); *G05D 1/0251* (2013.01); *G06T 7/13* (2017.01); *G06T 7/33* (2017.01); *G06T 7/55* (2017.01); *G06T 7/80* (2017.01); *H04N 5/04* (2013.01); *B60R 2011/004* (2013.01); *G05D 2201/0213* (2013.01); *G06T 2207/10024* (2013.01); *G06T 2207/10028* (2013.01); *G06T 2207/20221* (2013.01); *G06T 2207/30252* (2013.01)

(58) Field of Classification Search
CPC . G05D 1/0251; G05D 2201/0213; H04N 5/04
See application file for complete search history.

(56) References Cited

U.S. PATENT DOCUMENTS

| 10,663,590 | B2* | 5/2020 | Rzeszutek | G01S 17/42 |
|---|---|---|---|---|
| 2008/0112610 | A1* | 5/2008 | Israelsen | G06T 17/00 |
| | | | | 382/154 |
| 2015/0304634 | A1* | 10/2015 | Karvounis | G06T 7/277 |
| | | | | 348/46 |
| 2016/0104289 | A1* | 4/2016 | Chang | G05D 1/0248 |
| | | | | 382/154 |
| 2016/0291155 | A1 | 10/2016 | Nehmadi et al. | |
| 2017/0061632 | A1* | 3/2017 | Lindner | G01S 17/86 |
| 2018/0003822 | A1 | 1/2018 | Li et al. | |
| 2018/0136314 | A1* | 5/2018 | Taylor | G01S 7/484 |
| 2018/0232947 | A1* | 8/2018 | Nehmadi | G01S 17/931 |
| 2018/0373980 | A1* | 12/2018 | Huval | G06K 9/00805 |
| 2019/0235083 | A1* | 8/2019 | Zhang | G01S 7/4808 |
| 2019/0353784 | A1* | 11/2019 | Toledano | G01S 17/86 |
| 2020/0064483 | A1* | 2/2020 | Li | G01S 17/87 |
| 2020/0217666 | A1* | 7/2020 | Zhang | G01S 15/86 |

OTHER PUBLICATIONS

Ushani et al., "A Learning Approach for Real-Time Temporal Scene Flow Estimation frpom Lidar Data" 2017 IEEE, (ICRA) Singapore, Jun. 3, 2017 (Year: 2017).*

Agrawal et al., "PCE-SLAM: A Real-time Simultaneous Localization and Mapping ising Lidar data", 2017, IEEE Inteligent Vehicle Symposium, CA, USA, Jun. 2017 (Year: 2017).*

Dhall et al., "LiDAR-Camera Calibration using 3D-3D Point correspondences", International Institute of Information and Technology , Hyderabad, May 2017 (Year: 2017).*

International Search Report (PCT/ISA/210) issued in PCT Application No. PCT/EP2018/056799 dated Jun. 4, 2018 (four (4) pages).

Written Opinion (PCT/ISA/237) issued in PCT Application No. PCT/EP2018/056799 dated Jun. 4, 2018 (six (6) pages).

Extended European Search Report issued in counterpart European Application No. 17184869.0 dated Feb. 9, 2018 (eight (8) pages).

* cited by examiner

METHOD, APPARATUS AND COMPUTER PROGRAM FOR A VEHICLE

CROSS REFERENCE TO RELATED APPLICATIONS

This application is a continuation of PCT International Application No. PCT/EP2018/056799, filed Mar. 19, 2018, which claims priority under 35 U.S.C. § 119 from European Patent Application No. 17184869.0, filed Aug. 4, 2017, the entire disclosures of which are herein expressly incorporated by reference.

BACKGROUND AND SUMMARY OF THE INVENTION

The invention relates to a method, an apparatus and a computer program for a vehicle, as well as to a vehicle, and more specifically, but not exclusively, to determining a combined image of lidar sensor data and camera sensor data.

Autonomous driving and assisted driving are two major topics of automotive research. A major prerequisite of both may be to sense the surroundings of the vehicle, to enable a recognition of objects and other drivers. One approach may be to sense a distance of objects surrounding the vehicle using a Lidar sensor.

There may be a demand to provide an improved concept for detecting objects in a vicinity of a vehicle, which may enable a more precise determination of a location of these objects.

Embodiments of the invention relate to a method, an apparatus and a computer program for a vehicle and to a vehicle. The method may combine lidar sensor data (of a lidar sensor) and camera sensor data (of a camera) to determine a combined image comprising both distance information (of the lidar sensor data) and color information (of the camera sensor data). To create a more precise overlay of the distance information and of the color information, a motion of the vehicle may be compensated for in the determination of the combined image, e.g. to account for a time required for a rotation of the lidar sensor.

Embodiments provide a method for a vehicle. The method comprises obtaining camera sensor data of a camera of the vehicle. The method further comprises obtaining lidar sensor data of a lidar sensor of the vehicle. The method further comprises determining information related to a motion of the vehicle. The method further comprises determining a combined image of the camera sensor data and the lidar sensor data based on the information related to the motion of the vehicle.

This may enable accounting for a distance traveled by the vehicle during a rotation of the lidar sensor, and may enable a more precise determination of the combined image, e.g. with an improved alignment.

In at least some embodiments, the method may further comprise compensating for the motion of the vehicle in the determination of the combined image. The resulting combined image may have a better alignment between the lidar sensor data and the camera sensor data.

In at least some embodiments, the method may further comprise transforming a point cloud within the lidar sensor data based on the information related to the motion. The determining of the combined image may be based on the transformed point cloud. In various embodiments, the transforming of the point cloud transposes at least a part of the point cloud to an estimated position of the part of the point cloud at a time a corresponding camera image of the camera sensor data is taken based on the information related to the motion. Transforming the point cloud may enable the determination of distance/depth/intensity values of the point cloud at the point in time the camera sensor data was taken by the camera sensor.

In various embodiments, the method may further comprise performing a time synchronization between the camera sensor data and the lidar sensor data. The determining of the combined image may be further based on the time synchronization between the camera sensor data and the lidar sensor data. The time synchronization may enable a better alignment of the camera sensor data and the lidar sensor data.

In at least some embodiments, the determining of the time synchronization may be triggered based on the lidar sensor. For example, the time synchronization may be based on a rotation angle of the lidar sensor. Using the lidar sensor, e.g. a rotation angle of the lidar sensor, as reference may enable a more precise alignment of the camera sensor data and the lidar sensor data as the triggering of an image capture using the camera sensor may more readily adjustable.

In various embodiments, the method may further comprise determining information related to one or more edges within the camera sensor data and information related to one or more intensity discontinuities within the lidar sensor data. The determining of the combined image may be based on the information related the one or more edges and based on the information related to the one or more intensity discontinuities. Matching the edges and the intensity discontinuities may enable a mapping of distance/depth/intensity values to pixels of image frames of the camera sensor data.

In at least some embodiments, the method may further comprise determining a calibration of the camera sensor data and of the lidar sensor data based on the information related to the one or more edges and based on the information related to the one or more intensity discontinuities. The determining of the combined image may be based on the calibration of the camera sensor data and of the lidar sensor data. The calibration may match the camera sensor data and the lidar sensor data to the common coordinate system.

In various embodiments, the determining of the information related the one or more edges and of the information related to the one or more intensity discontinuities may be performed while the vehicle is in motion. This may enable a constant re-adjustment of the (extrinsic) calibration, and might render a factory-based extrinsic calibration obsolete.

In at least some embodiments, the determining of the combined image may comprise assigning at least one of a distance value, a depth value and an intensity value to pixels of the combined image. For example, the determining of the combined image may comprise overlaying distance information of the lidar sensor data onto an image constructed from the camera sensor data. This may enable a combined processing of the distance information and color information of the combined image, e.g. using a convolutional neural network.

Embodiments further provide a computer program having program code for performing the method, when the computer program is executed on a computer, a processor, or a programmable hardware component.

Embodiments further provide an apparatus for a vehicle. The apparatus comprises at least one interface configured to communicate with a camera of the vehicle and to communicate with a lidar sensor of the vehicle. The apparatus further comprises a processing module configured to obtain camera sensor data of the camera. The processing module is further configured to obtain lidar sensor data of the lidar sensor. The processing module is further configured to determine information related to a motion of the vehicle.

The processing module is further configured to determine a combined image of the camera sensor data and the lidar sensor data based on the information related to the motion of the vehicle.

Embodiments further provide a vehicle comprising such an apparatus.

Some examples of apparatuses and/or methods will be described in the following by way of example only, and with reference to the accompanying figures.

DETAILED DESCRIPTION OF THE DRAWINGS

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1A:
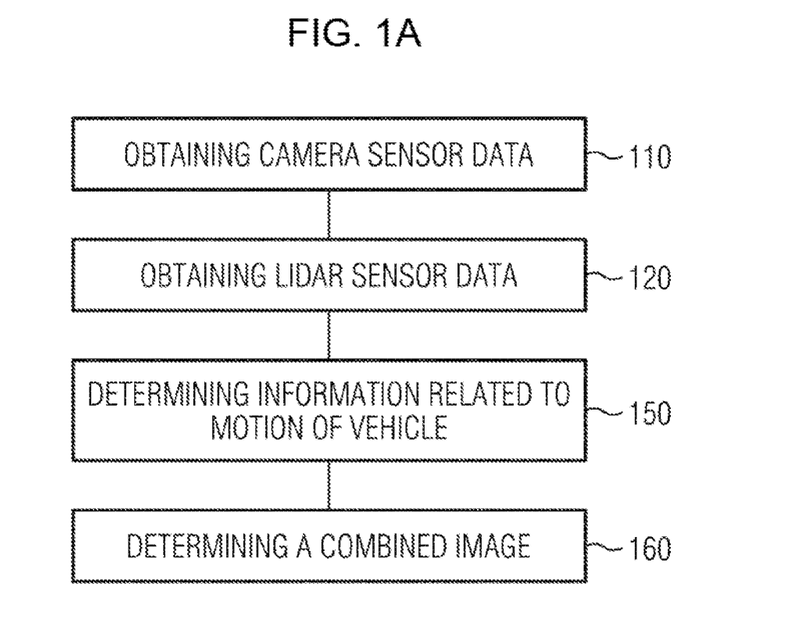
FIG. 1A shows a flow chart of a method for a vehicle.
Figure 1B:
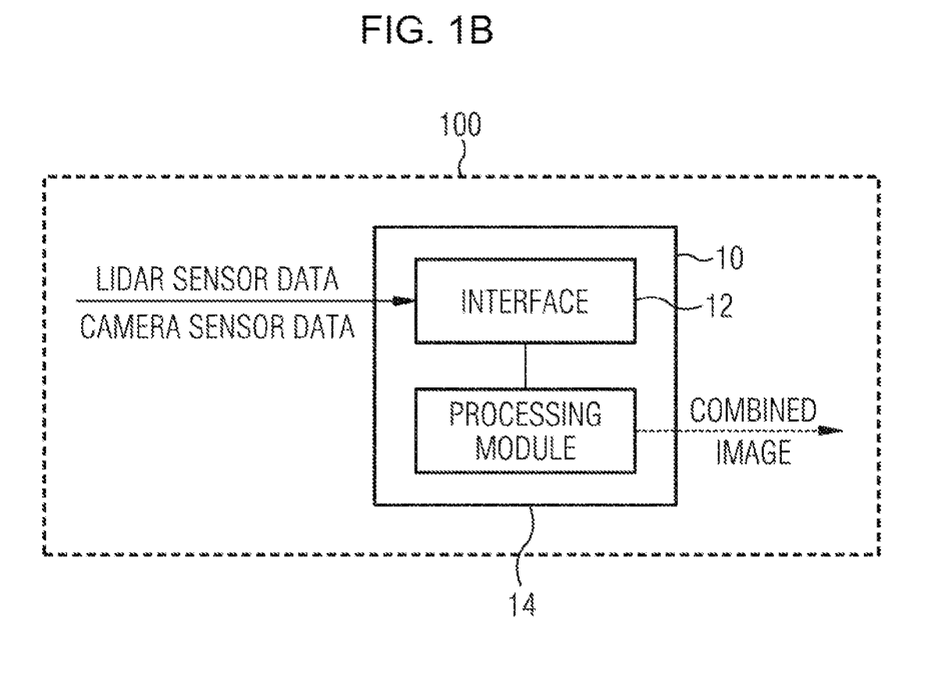
FIG. 1B shows a block diagram of an apparatus for a vehicle.

FIG. 1A illustrates a flow chart of a method for a vehicle 100. FIG. 1B illustrates a block diagram of a corresponding apparatus for the vehicle 100. The apparatus 10 comprises at least one interface 12 configured to communicate with a camera of the vehicle 100 and to communicate with a lidar sensor of the vehicle 100. The apparatus 10 further comprises a processing module 14 configured to execute the method of FIG. 1A, e.g. the method steps 110 to 170. The at least one interface 12 is coupled to the processing module 14. In various embodiments, the apparatus 10 further comprises the lidar sensor and/or the camera. FIG. 1B further illustrates a block diagram of the vehicle 100 comprising the apparatus 10. In at least some embodiments, the vehicle 100 may be one of an automobile, a motorbike, an autonomous vehicle, a semi-autonomous vehicle, a vessel, a train, a truck, a lorry or a van.

The method (of FIG. 1A) comprises obtaining 110 camera sensor data of a camera of the vehicle 100. The method further comprises obtaining 120 lidar sensor data of a lidar sensor of the vehicle 100.

In various embodiments, the camera may be one of a video camera, a high-speed camera or a still image camera. The camera sensor data may be a raw output of the camera. Alternatively, the camera sensor data may be pre-processed sensor data of the camera. For example, the camera sensor data may comprise a plurality of image frames. An image frame of the plurality of image frames may comprise a plurality of pixels, e.g. a plurality of pixels in a two-dimensional arrangement. For example, a frame rate of the camera sensor data and/or a triggering of frames within the camera sensor data may be matched to a rotation speed and/or a rotation angle of the lidar sensor. For example, the camera may comprise a camera sensor (e.g. a CMOS (Complementary Metal-Oxide-Semiconductor) sensor or a CCD (Charge-Coupled Device) and a camera lens. The camera may be configured to provide the camera sensor data to the apparatus 10. For example, the camera sensor data may comprise raw camera sensor data (e.g. a raw output of the sensor) or pre-processed camera sensor data (e.g. image information, color information). In some embodiments, the camera sensor data may comprise a stream of image frames (e.g. in a moving picture file format). Alternatively, the camera sensor data may comprise separate images (image frames). The camera sensor data may comprise image information, e.g. color information for each pixel of the image information.

Lidar (or LiDAR) is either a portmanteau of Light and Radar (Radio Detection and Ranging), or an acronym of Light Detection and Ranging or Light Imaging, Detection and Ranging. In at least some embodiments, the lidar sensor may be configured to determine the lidar sensor data based on emitting light (e.g. pulsed laser light) and measuring a portion of the light reflected from objects in a vicinity of the lidar sensor. The lidar sensor data may comprise distance information. In at least some cases, the terms depth (or depth information, depth value) and distance (or distance information, distance value) may be used interchangeably. For example, the lidar sensor data may comprise a point cloud of distance information. For example, the distance information may comprise information related to a distance of a plurality of points (e.g. of the point cloud) from the lidar sensor (distance values), information related to a depth of a space in a vicinity of the lidar sensor demarcated by objects surrounding the lidar sensor (depth values), and/or information related to an intensity of a portion of light emitted by the lidar sensor, reflected by objects in a vicinity of the lidar sensor and measured by the lidar sensor (intensity values). For example, the intensity values may indicate a distance and/or a coloring of objects reflecting the portion of the emitted light. The point cloud may comprise distance information for different vertical and/or horizontal angles around a rotation axis of the lidar sensor. For example, the lidar sensor may be configured to rotate at a predefined or adjustable rotation frequency. The lidar sensor data may comprise a point cloud of distance information for each rotation or for a subset of rotations of the lidar sensor. For example, a spatial resolution of the lidar sensor data may be lower than a spatial resolution of the camera sensor data.

The method further comprises determining 150 information related to a motion of the vehicle 100. The method further comprises determining 160 a combined image of the camera sensor data and the lidar sensor data based on the information related to the motion of the vehicle. This may enable accounting for a distance traveled by the vehicle during a rotation of the lidar sensor.

For example, the information related to the motion of the vehicle may comprise information related to a movement of the vehicle, e.g. related to at least one of a velocity of the vehicle, a steering angle of the vehicle, a movement of the vehicle along the road and a movement of the vehicle orthogonal to a direction of the road. For example, the determining 160 of the combined image may comprise compensating the motion of the vehicle for the combined image, e.g. based on the time synchronization between the camera sensor data and the lidar sensor data. For example, the method may further comprise compensating for the motion of the vehicle in the determination of the combined image. The resulting combined image may have a better alignment between the lidar sensor data and the camera sensor data. For example, the method may comprise transforming a point cloud within the lidar sensor data based on the information related to the motion, e.g. and based on a predetermined time-offset between the lidar sensor data and the camera sensor data (as indicated by the time synchronization). The determining 160 of the combined image may be based on the transformed point cloud. The compensating for the motion may transform the point cloud such that the transformed point cloud indicates an estimated distance of objects in a vicinity of the vehicle at a specific point of time (as opposed to the period of time required by a rotation of a rotational lidar sensor), e.g. as if the lidar sensor had recorded the point cloud all at once at the specific point of time. The transforming of the point cloud may transpose at least a part of the point cloud to an estimated position of the part of the point cloud at a time a corresponding camera image of the camera sensor data is taken based on the information related to the motion, e.g. based on a predetermined time-offset between the lidar sensor data and the camera sensor data (as indicated by the time synchronization). Transforming the point cloud may enable the determination of the distance/depth/intensity values of the point cloud at the point in time the camera sensor data was taken by the camera sensor.

In various embodiments, the method further comprises performing a time synchronization 140 between the camera sensor data and the lidar sensor data. For example, the performing of the time synchronization may comprise synchronizing an image capturing by the camera for the camera sensor data and a measuring of point clouds by the lidar sensor for the lidar sensor data. Alternatively or additionally, the performing of the time synchronization may comprise determining a time offset between the lidar sensor data and the camera sensor data. For example, the performing of the time synchronization may bring a capture time of images captured by the camera for the camera sensor data into a predetermined temporal relationship with a capture time of point clouds captured by the lidar sensor for the lidar sensor data. For example, the determining 160 of the combined image may be further based on the time synchronization between the camera sensor data and the lidar sensor data. The time synchronization may enable a better alignment of the camera sensor data and the lidar sensor data. For example, the method may further comprise triggering the camera to capture an image (frame) for the camera sensor data based on the time synchronization. For example, the method may further comprise triggering the lidar sensor to capture a point cloud for the lidar sensor data based on the time synchronization.

In at least some embodiments, the performing 140 of the time synchronization is triggered based on the lidar sensor. For example, the time synchronization may be based on a rotation of the lidar sensor, e.g. based on a frequency of the rotation, based on a time of the rotation and/or based on a rotation angle. For example, when the lidar sensor completes or commences a recording of a point cloud of one rotation of the lidar sensor, the camera sensor may be triggered. Alternatively, the camera sensor may be triggered based on a current rotation angle of the lidar sensor. The time synchronization may be based on a rotation angle of the lidar sensor. For example, a hardware sensor (e.g. an induction sensor (to sense a magnetic marking of the lidar sensor) or an optical sensor) may be configured to detect a predetermined angle of the rotation of the lidar sensor (e.g. an encoder position) and to trigger the camera sensor based on the detected predetermined angle. Alternatively, the rotation angle may be determined based on a rotation frequency and based on a predetermined start time of the rotation of the lidar sensor. The rotation angle may be determined based on a time offset since the predetermined start time of the rotation and based on the rotation frequency. Using the lidar sensor, e.g. a rotation angle of the lidar sensor, as reference may enable a more precise alignment of the camera sensor data and the lidar sensor data as the triggering of an image capture using the camera sensor may more readily adjustable.

For example, the determining 160 of the combined image may comprise determining a mapping between distance information within the lidar sensor data and color information (e.g. image information or pixel information) within the camera sensor data. For example, the determining 160 of the combined image may comprise determining distance information for each pixel of the color information within the camera sensor data or for each pixel of a cropped portion of the color information within the camera sensor data. The determining 160 of the combined image may comprise assigning a distance value, a depth value or an intensity value to pixels/points of the combined image, e.g. to each pixel/point of the combined image. This may enable the determination of the combined image. For example, the lidar sensor data may comprise a point cloud of distance information. The determining 160 of the combined image may comprise projecting points of the point cloud onto a camera plane of the camera sensor data. For example, the projecting of the point cloud onto the camera plane may comprise translating the points of the point cloud into a coordinate system of the camera sensor data or into a common coordinate system used for the combined image. The projection may enable a mapping of distance (or depth, intensity) values to pixels of image frames of the camera sensor data. For example, a distance value/depth/intensity value of a pixel/point of the combined image may indicate or approximate a distance of said pixel/point from the vehicle 100 (e.g. from the lidar sensor). The combined image may comprise distance information (e.g. the distance value/depth/intensity value for the points/pixels of the combined image) and color information (e.g. three-channel color information for the pixels/points of the combined image). This may enable a combined processing of the combined image, e.g. using a (convolutional) neural network. The determining 160 of the combined image may comprise overlaying distance information of the lidar sensor data onto an image constructed from the camera sensor data.

In at least some embodiments, the combined image may be based on a common coordinate system, which may be different from a coordinate system of the color information (or pixel information/image information) and different from a coordinate system of the depth information. Alternatively, the common coordinate system may be the coordinate system of the color information (e.g. a camera coordinate system of the camera). The common coordinate system may be a two-dimensional coordinate system specifying a plurality of points arranged in a two-dimensional formation. For example, the determining 160 of the combined image may comprise determining distance information for each point of the plurality of points specified by the common coordinate system. For example, the determining 160 of the combined image may comprise mapping the camera sensor data (e.g. the color information within the camera sensor data) to the common coordinate system (e.g. to the plurality of points specified by the common coordinate system).

In at least some embodiments, the method may further comprise upsampling a resolution of distance information (e.g. distance values, depth values, intensity values) within the combined image to match a spatial resolution of color information within the combined image. The upsampling may improve a processing by the neural network. For example, the upsampling may comprise determining a distance value (or depth value, intensity value) for each pixel of the color information within the combined image. For example, the upsampling may comprise determining a distance value (depth value, intensity value) for each point within the common coordinate system. For example, the upsampling may be based on a bilateral filtering of the lidar sensor data.

Figure 1C:
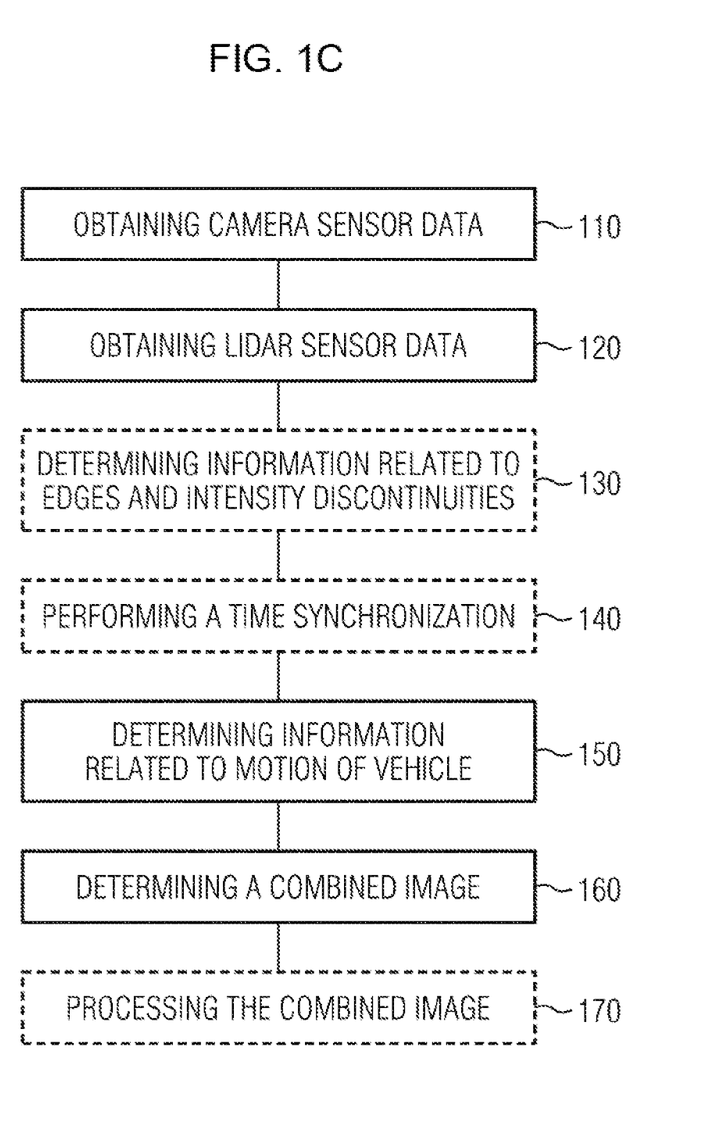
FIG. 1C shows another flow chart of a method for a vehicle.

In various examples, as shown in FIG. 1C, the method may further comprise determining 130 information related to one or more edges within the camera sensor data and information related to one or more intensity discontinuities (or one or more depth discontinuities/distance discontinuities) within the lidar sensor data. For example, the determining 130 of the information related to the one or more edges may comprise detecting one or more brightness discontinuities and/or one or more color discontinuities within the camera sensor data. For example, the determining of the information related to the one or more edges may comprise comparing color values and/or brightness values of adjacent pixels within the camera sensor data to identify the one or more edges. The determining of the information related to the one or more intensity discontinuities may comprise comparing intensity values and/or depth values of adjacent points within the point cloud of the lidar sensor data to identify the one or more intensity discontinuities (or depth discontinuities). The one or more edges may align with the one or more brightness discontinuities and/or the one or more color discontinuities within the combined image. The determining 160 of the combined image may be based on the information related the one or more edges and based on the information related to the one or more intensity discontinuities. Matching the edges and the intensity discontinuities may enable a mapping of distance/depth/intensity values to pixels of image frames of the camera sensor data. For example, the determining 160 of the combined image may comprise reducing a mismatch of an overlay of the one or more edges within the camera sensor data and the one or more intensity discontinuities within the lidar sensor data, e.g. data over a plurality of frames within the camera sensor data and over a plurality of point clouds within the lidar sensor data. For example, the reducing of the mismatch may comprise transforming (e.g. shifting, rotating, translating and/or scaling) the lidar sensor data and/or the camera sensor data to improve an alignment of the one or more edges with the one or more intensity discontinuities. The reducing of the mismatch may comprise determining translation and rotation parameters to reduce the mismatch between the one or more edges within the camera sensor data and the one or more intensity discontinuities within the lidar sensor data. For example, the determining of the translation and rotation parameters may be based on an initial guess (e.g. based on a previously reduced mismatch between the one or more edges and the one or more intensity discontinuities) and a subsequent adjustment of the translation and rotation parameters. For example, the translation and rotation parameters may be gradually adjusted from the initial guess as long as the mismatch decreases. The calibration may match or project the camera sensor data and the lidar sensor data to a common coordinate system.

In various examples, the method may further comprise transforming a point cloud of the lidar sensor data based on the information related the one or more edges and based on the information related to the one or more intensity discontinuities. For example, the transforming of 5 the point cloud may (substantially) align the one or more intensity discontinuities with the one or more edges within the common coordinate system. For example, the transforming of the point cloud may project the point cloud to the common coordinate system so that the one or more intensity discontinuities are substantially aligned with the one or more edges. The determining 160 of the combined image may be based on the transformed point cloud. Transit forming the point cloud (e.g. scaling, shifting or translating the point cloud) may enable a mapping of distance/depth/intensity values to pixels of image frames of the camera sensor data.

In at least some examples, the determining 130 of the information related to the one or more 15 edges within the camera sensor data and the information related to the one or more intensity discontinuities within the lidar sensor data may be based on a plurality of frames of the camera sensor data and based on a plurality of point clouds of the lidar sensor data. For example, the plurality of frames of the camera sensor data and the plurality of point clouds may be based on a changing scenery, e.g. while the vehicle is in motion. For example, the determining 130 of the information related the one or more edges and of the information related to the one or more intensity discontinuities may be performed while the vehicle is in motion, e.g. while the vehicle in motion and/or based on a changing scenery. This may enable a constant re-adjustment of the (extrinsic) calibration, and might render a factory-based extrinsic calibration obsolete. For example, the plurality of frames of the camera sensor data and the plurality of point clouds might not be based on a static scenery, e.g. might not be based on a calibration checkerboard. In various embodiments, the camera sensor data may comprise a plurality of frames. The determining 130 of the information related the one or more edges may comprise detecting the one or more edges over the plurality of frames. For example, the determining 130 of the information related to the one or more edges may increase a precision of the detection of the one or more edges of the plurality of frames. The determining 130 of the information related to the one or more edge may comprise tracking the one or more edges over the plurality of frames. The lidar sensor data may comprise a plurality of point clouds of the lidar sensor data. The determining 130 of the information related to the one or more intensity discontinuities may comprise detecting the one or more discontinuities over the plurality of point clouds. The determining 130 of the information related to the one or more edge may comprise tracking the one or more intensity discontinuities of the plurality of points clouds. This may enable a more precise alignment e.g. while the vehicle is in motion. The plurality of frames of the camera sensor data and the plurality of point clouds may be obtained from the camera and from the lidar sensor during a predefined timeframe. For example, the determining 130 of the information related to the one or more edges may be performed after the plurality of frames of the camera sensor data and the plurality of point clouds are recorded by the lidar sensor and by the camera. For example, the plurality of frames may comprise at least 5 (or at least 10, or at least 20, or at least 30) frames. The plurality of point clouds may comprise at least 5 (or at least 10, at least 20, at least 30) point clouds. For example, the determining 130 of the information related to the one or more edges within the camera sensor data and the information related to the one or more intensity discontinuities within the lidar sensor data may be performed while the vehicle is in motion. For example, the determining 160 of the combined image may comprise (gradually) reducing a mismatch of an overlay of the one or more edges over the plurality of (image) frames of the camera sensor data and the one or more intensity discontinuities of the plurality of point clouds within the lidar sensor data. Alternatively, the determining 130 of the information related to the one or more edges within the camera sensor data and the information related to the one or more intensity discontinuities within the lidar sensor data may be performed while the vehicle is standing (static).

In at least some embodiments, the method further comprises determining a calibration of the camera sensor data and of the lidar sensor data based on the information related to the one or more edges and based on the information related to the one or more intensity discontinuities. For example, the calibration may be an extrinsic calibration of the camera sensor data and of the lidar sensor data. The calibration may indicate at least one transformation parameter (e.g. first and second transformation parameters) for a projection or transformation of the lidar sensor data and/or of the camera sensor data onto the common coordinate system. The calibration may indicate at least one transformation parameter (e.g. first and second transformation parameters) for overlaying the lidar sensor data and the camera sensor data such that outlines of an object comprised within the lidar sensor data substantially match outlines of the object comprised within the camera sensor data. The determining 160 of the combined image may be based on the calibration of the camera sensor data and of the lidar sensor data. For example, the determining of the calibration may be based on reducing a mismatch of an overlay of the one or more edges within the camera sensor data and the one or more intensity discontinuities within the lidar sensor data, e.g. over a plurality of frames within the camera sensor data and a plurality of point clouds within the lidar sensor data. For example, the reducing of the mismatch may comprise determining translation and rotation parameters to reduce the mismatch between the one or more edges within the camera sensor data and the one or more intensity discontinuities within the lidar sensor data. The calibration may match the camera sensor data and the lidar sensor data to the common coordinate system.

In various embodiments, the determining of the calibration comprises determining first transformation parameters for transforming the camera sensor data from a camera coordinate system to the common coordinate system. The determining of the calibration may comprise determining second transformation parameters for transforming the lidar sensor data from a lidar coordinate system to the common coordinate system. For example, the first transformation parameters and/or the second transformation parameters may comprise at least one element of the group of cropping parameters, scaling parameters, shifting parameters and rotational parameters. The combined image may be based on the common coordinate system. For example, the determining 160 of the combined image may comprise transforming or projecting the camera sensor data to the common coordinate system based on the first transformation parameters. The determining 160 of the combined image may comprise transforming or projecting the lidar sensor data (e.g. one or more point clouds within the lidar sensor data) to the common coordinate system based on the second transformation parameters. The common coordinate system may enable a combined processing of the combined image, e.g. using a (convolutional) neural network.

In various embodiments, the determining of the calibration may be performed or triggered according to a predefined time-interval (e.g. every hour, every predetermined amount of hours, every day, every week), based on a power cycle of the vehicle 100 (e.g. every time the vehicle 100 is started) and/or based on a motion of the vehicle 100. As a calibration mismatch may occur, such events may trigger the calibration. For example, the determining of the calibration may be triggered, if the motion of the vehicle violates a motion threshold, e.g. if the vehicle encounters a road bump or road conditions that are detrimental to a precision of the calibration.

In at least some embodiments, the method may further comprise processing 170 the combined image using an artificial neural network. The neural network may for example perform object recognition and/or identify regions of interest within the combined image. For example, the artificial neural network may be a pretrained neural network. Alternatively, the artificial neural network may be at least partially trained based on the lidar sensor and/or based on the camera (e.g. based on the lidar sensor model and/or based on the camera sensor model). The artificial neural network may be configured to detect and/or classify at least one object within the combined image. For example, the artificial neural network may be configured to determine a bounding box for at least one classified object within the combined image. For example, the artificial neural network may be configured to detect one or more classes of objects within the combined image. The artificial neural network may be configured to detect at least one element of the group of other vehicles, pedestrians and traffic signs within the combined image. Alternatively or additionally, the artificial neural network may be configured to segment the combined image. For example, the artificial neural network may be configured to identify regions of interest within the combined image. The method may further comprise processing the regions of interest, e.g. using the artificial neural network, using another artificial neural network and/or using a processor. In various embodiments, the artificial neural network and/or the other artificial neural network may be implemented using a dedicated circuit, e.g. an application specific integrated circuit for implementing the artificial neural network. Alternatively, the artificial neural network may be implemented in software, e.g. executed by a processor of the processing module.

In at least some embodiments, the artificial neural network is a convolutional neural network. Convolutional neural networks may offer a number of advantages in the processing of image data. For example, the combined image may comprise the distance information in an image format for as input for the convolutional neural network. The artificial neural network may comprise a plurality of inputs. At least one of the plurality of inputs may be based on color information of the combined image. At least one of the plurality of inputs may be based on distance information (e.g. distance values, depth values or intensity values) of the combined image. For example, three inputs of the plurality of inputs may be based on the color information of the combined image (e.g. red, green and blue channels). Three inputs of the plurality of inputs may be based on the distance information of the combined image (e.g. converted into a three-channel image format. Processing both color information and depth, distance or intensity information of the combined image within the artificial neural network may improve a recognition or classification of objects and a segmentation of the combined image.

In various embodiments, the method may further comprise transforming distance information (e.g. depth/distance/intensity values) of the combined image into a three-channel image format. The processing 170 of the combined image may be based on the three-channel image format. For example, the three-channel image format may be based on a three-channel color map providing a linear conversion between distance values (or depth values, intensity values) and color values, e.g. a JET coloring or a coloring similar to JET coloring. The three-channel image format is based on one or more elements of the group of horizontal disparity, height above ground and angle with gravity (HHA). The three-channel image format may be analyzed using pre-trained convolutional neural networks.

The at least one interface 12 may correspond to one or more inputs and/or outputs for receiving and/or transmitting information, which may be in digital (bit) values according to a specified code, within a module, between modules or between modules of different entities. In embodiments the processing module 14 may be implemented using one or more processing units, one or more processing devices, any means for processing, such as a processor, a computer or a programmable hardware component being operable with accordingly adapted software. In other words, the described function of the processing module 14 may as well be implemented in software, which is then executed on one or more programmable hardware components. Such hardware components may comprise a general purpose processor, a Digital Signal Processor (DSP), a micro-controller, etc.

Other systems for providing RGB-Depth fused data may comprise combined sensors. The problem with some systems if there are multiple sensors involved may be timing issues as different sensors may operate at different frequencies and may take time to measure the scene. This, coupled with relative motion among the objects in the scene, may give rise to larger errors as different sensors sees the 'same' object at different locations depending on these factors. Also having only a sparse depth map tied to the RGB might not be ideal for machine learning or localization purposes of the objects in the scene.

At least some embodiments may comprise a rotational laser scanner (e.g. the lidar sensor) and a camera (e.g. the camera) which may interact with each other via an automatic calibration process. To account for distortions in the point cloud when the Lidar is moving, ego-motion compensation (e.g. compensating for the motion of the vehicle) may be performed based on vehicle odometry (e.g. based on the motion of the vehicle). This may reduce the errors of static objects when the car is moving. By triggering/time synchronizing both sensors, errors of both dynamic and static may be reduced. The multi sensor arrangement may be similar to other systems. In at least some embodiments, the paired point cloud may be upsampled to the same density as the RGB images from the camera resulting in Kinect-like scenes for outdoors.

In an exemplary embodiment, wherein the lidar rotates with 10 Hz, one full measurement may take 100 ms. During this time the car may move, so that the lidar coordinate system may move constantly. With the egomotion compensation, (all) measured points may be transformed to one basic lidar coordinate system (e.g. the common coordinate system). This basic lidar co-ordinate system may the one which refers to the time when the camera was triggered to take an image.

By improving the quality of the sensor fusion, various embodiments may allow for better use of fused data in detection (neural) networks and especially for segmentation (neural) networks.

By upsampling the depth map (e.g. the point cloud within the lidar sensor data), which may have a structure similar to RGB, at least some embodiments may extend the depth representation (e.g. the distance information) more elaborately, e.g. generating Jet features or HHA features (for three-channel image formats) from them which may be used as inputs to convolutional neural networks for feature learning.

At least some embodiments may be based on egomotion compensation, time synchronization/triggering of multiple sensors and. upsampling of the depth map (e.g. the point cloud within the lidar sensor data) to match RGB (Red, Green, Blue) density (e.g. the spatial resolution within the image information).

The aspects and features mentioned and described together with one or more of the previously detailed examples and figures, may as well be combined with one or more of the other examples in order to replace a like feature of the other example or in order to additionally introduce the feature to the other example.

Figure 2A:
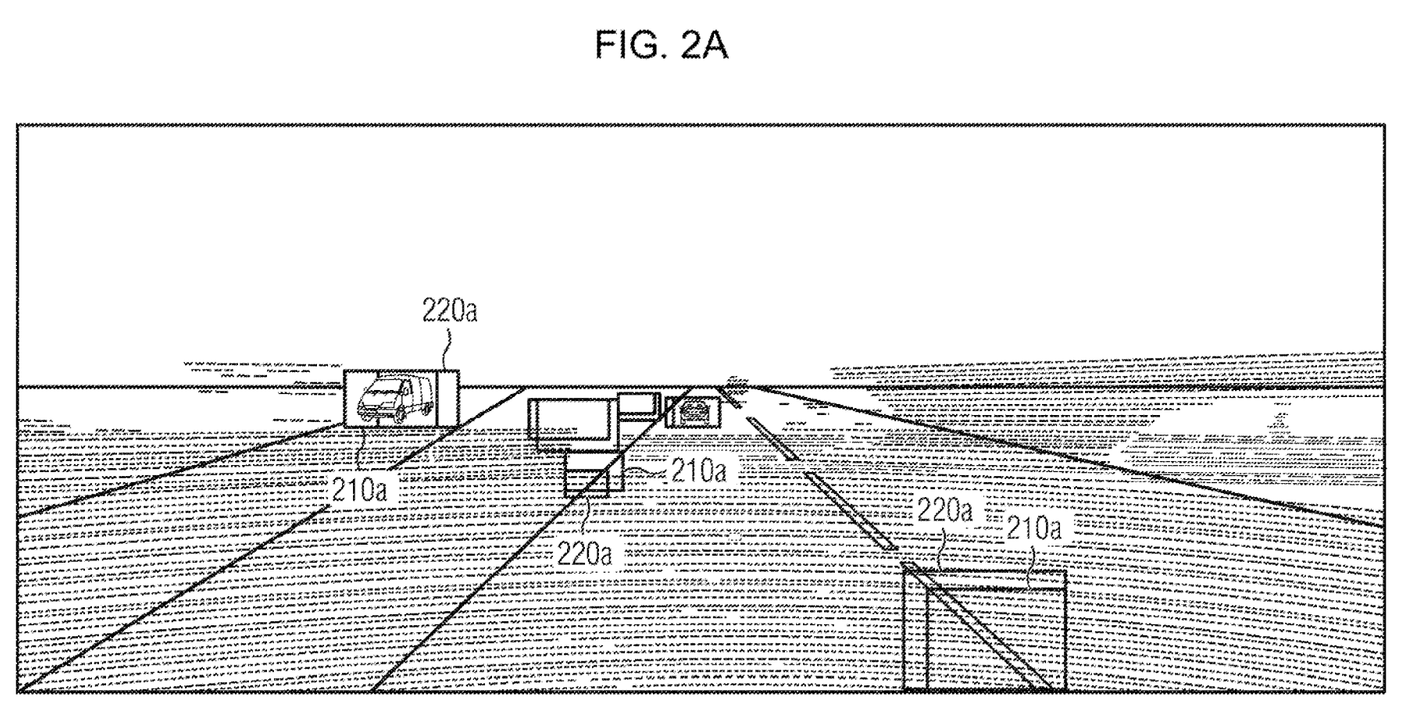
FIGS. 2A and 2B show an illustration of an effect on time synchronization on a detection of objects.
Figure 2B:
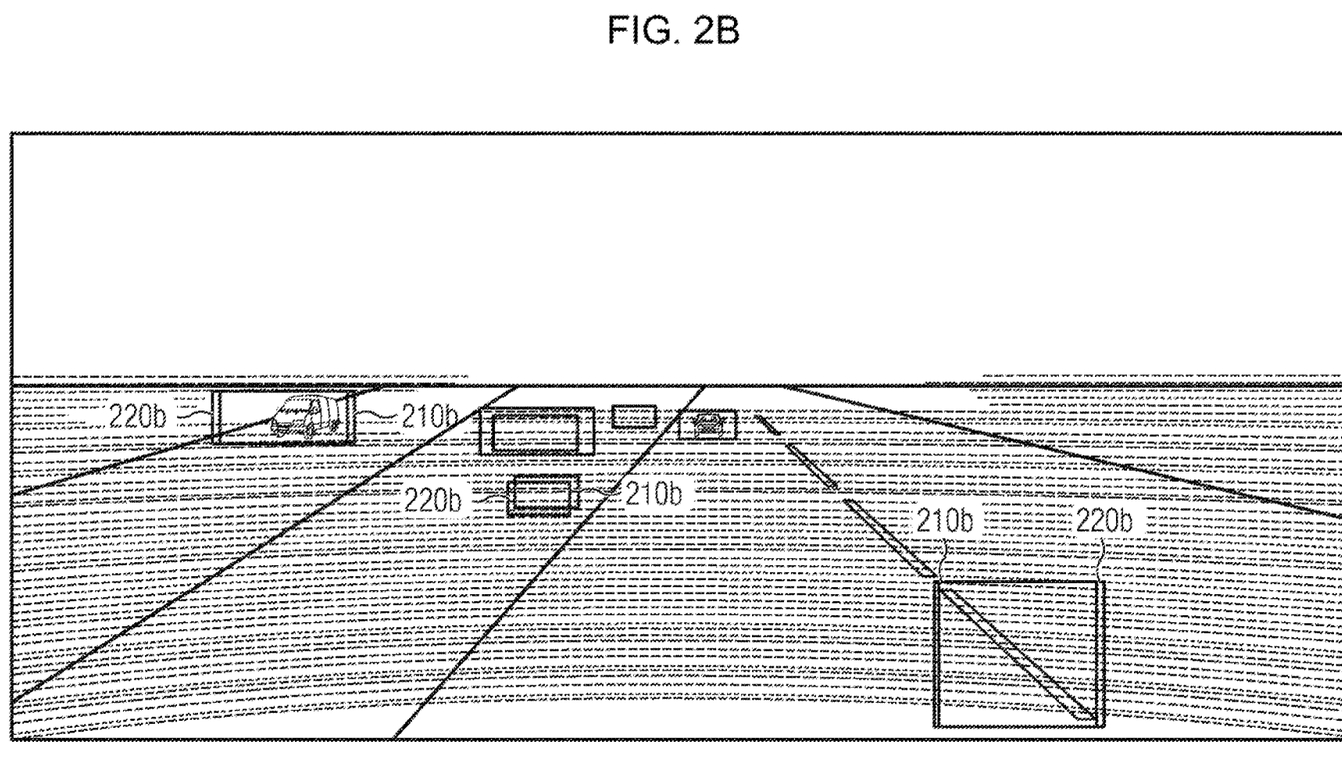

FIGS. 2A and 2B show an illustration of an effect on time synchronization on a detection of objects (indicated by bonding boxes 210a; 220a, 210b, 220b) according to an embodiment. In at least some embodiments, time synchronization (for sensor triggering) may be used in dynamic scenes. This may decrease a time difference between measurements of camera & LiDAR pair (e.g. between the camera sensor data and the lidar sensor data). In at least some embodiments, the Velodyne (e.g. the lidar sensor) may trigger the camera. FIGS. 2A and 2B show a view of the combined image towards a front of the vehicle according to an embodiment. Objects detected within FIG. 2A (without time synchronization) may show a larger mismatch between the bounding boxes 210a detected based on the lidar sensor data and the bounding boxes 220a detected based on the (RGB) camera sensor data than objects detected within FIG. 2B (with time synchronization, showing bounding boxes 210b detected based on the lidar sensor data and bounding boxes 220b detected based on the camera sensor data. In a comparative test, the mean IoU (Intersection over Union) values of the time-synchronized combined image were 78%, compared with 60% for a free-running combined image (without time synchronization), the minimal IoU was 53% compared with 25% for the free-running, and d(CoM) (L2-norm) values of 5.4 pixels and 12.6 pixels, respectively.

Figure 3A:
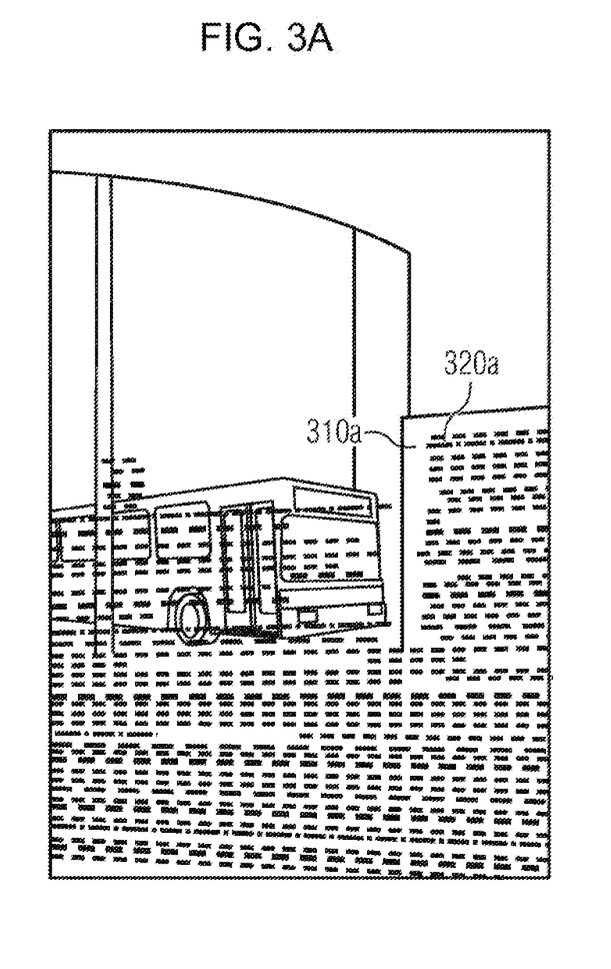
FIGS. 3A and 3B show an illustration of an effect of ego-motion compensation on an overlay of camera sensor data and lidar sensor data.
Figure 3B:
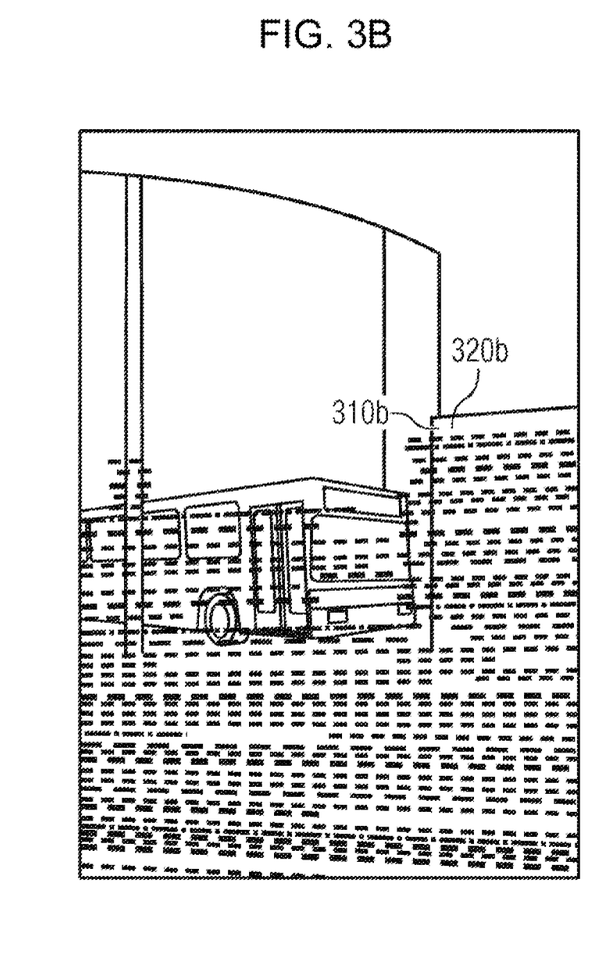

FIGS. 3A and 3B show an illustration of an effect of ego-motion compensation on an overlay of camera sensor data (310a; 310b) and lidar sensor data (320a; 320b) according to an embodiment. Ego-motion compensation may compensate (a skewing of) the point cloud due to motion of the vehicle. It may use vehicle odometry (e.g. the information related to the motion of the vehicle) to shift the point cloud, and may improve the precision for static objects (in the world) (less for dynamic objects (in the world)). FIGS. 3A and 3B may show an exemplary match between distance information and color information in a combined image based on sensor analysis of a bus passing under a bridge. FIG. 3a shows the combined image without ego-motion compensation (from a moving vehicle) with a larger mismatch between camera sensor data 310a and lidar sensor data 320a than the combined image with ego-motion compensation for the camera sensor data 310b and lidar sensor data 320b. In a comparative test, the mean IoU values of the ego-motion compensated combined image were 74%, compared with 77% for the combined image without ego-motion compensation, the minimal IoU was 78% compared with 81% and the d(CoM) (L2-norm) values were 6.2 pixels compared with 4.8 pixels. The d(Com) (L2-norm) refers to the error in Center of Mass (CoM). The error in Center of Mass (CoM) of the two corresponding bounding boxes is used as another metric to gauge the quality of fusion. An error in extrinsic calibration may introduce a systematic offset between the two bounding boxes. While not significant for large bounding boxes, the IoU of small bounding boxes may be greatly impacted by such a systematic error. The CoM ($c_x$, $c_y$) for a rectangular bounding box is the center point of the rectangle n, using the previous corner definitions is $c_x = x_{n2} + ^{-7,1 \wedge m2}$, $c_y = y_{n>1+}^{yn2-yTU}$. The error in center of mass (eCoM) is the difference between the CoMs of the bounding boxes for the same object in the camera image and in the projected point cloud.

At least some embodiments may be based on both ego-motion compensation (based on the ego-motion of the vehicle) and time synchronization of camera and lidar. At least some embodiments may trigger a camera shot right when the spinning lidar is facing in the same direction as the camera.

In at least some embodiments, point clouds (within the lidar sensor data) may be upsampled (processed to determine distance information at the same spatial resolution as the color information within the combined image). LiDAR output (e.g. the point clouds within the lidar sensor data) may be sparse compared to camera image. To obtain trustworthy depth information (distance information) for most of the pixels, the depth map may be upsampled. In various embodiments, bilateral filtering was shown to work well for LiDAR data.

Data fusion (e.g. within the combined image) may encode depth information in a way the detection (neural) network can understand it. It may comprise upsampling the sparse depth map (e.g. the point cloud of distance information), and coloring the distance information using JET coloring and/or HHA features.

Figure 4A:
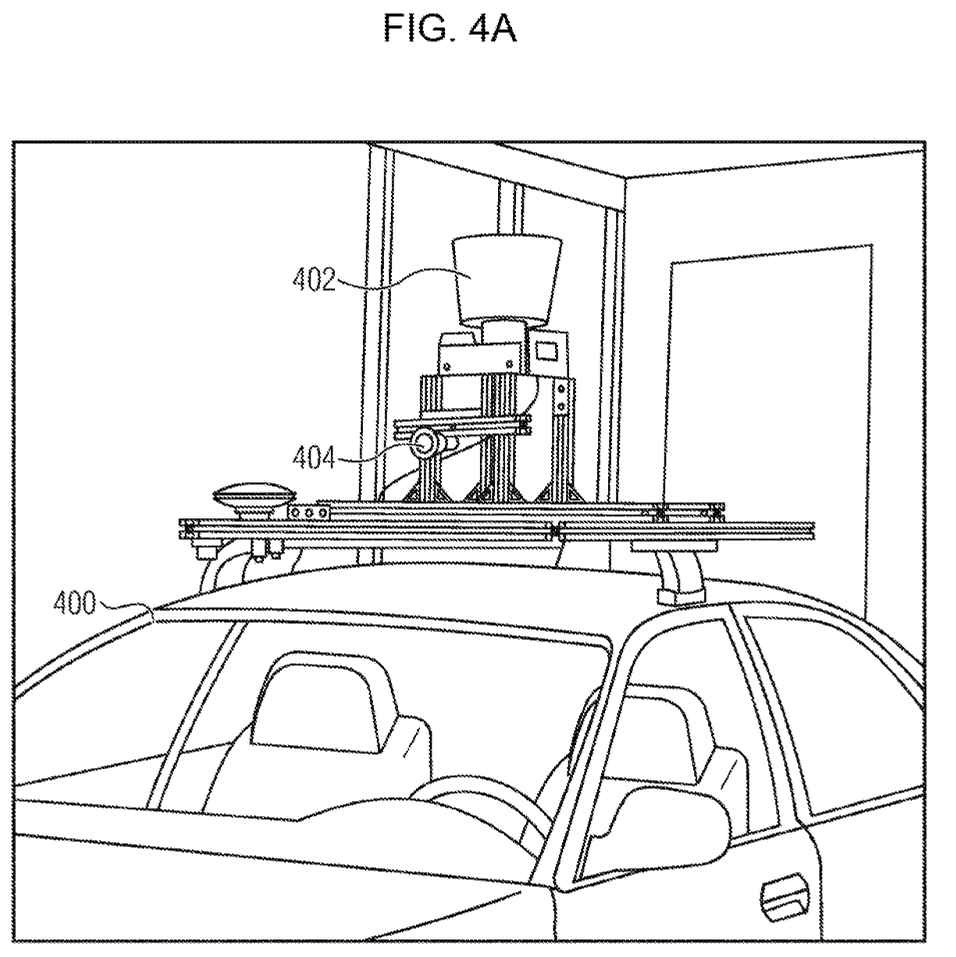
FIG. 4A shows a schematic diagram of a vehicle comprising a lidar sensor and a camera.

FIG. 4A shows a schematic diagram of a vehicle 400 (which may correspond to the vehicle 100) comprising a lidar sensor 402 and a camera 404 arranged on top of the vehicle.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, functions, processes, operations or steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that although a dependent claim may refer in the claims to a specific combination with one or more other claims other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for a vehicle, the method comprising:
   obtaining camera sensor data of a camera of the vehicle;
   obtaining Lidar sensor data of a Lidar sensor of the vehicle, the Lidar sensor data comprising a point cloud;
   determining information related to a motion of the vehicle;
   determining a combined image of the camera sensor data and the Lidar sensor data based on the information related to the motion of the vehicle;
   transforming the point cloud within the Lidar sensor data based on the information related to the motion,
   determining information related to one or more edges within the camera sensor data and information related to one or more intensity discontinuities within the Lidar sensor data;
   determining a mismatch of an overlay of the one or more edges within the camera sensor data and the one or more intensity discontinuities within the Lidar sensor data;
   reducing the mismatch of the overlay by transforming at least one of the Lidar sensor data or the camera sensor via shifting, rotating, translating, and/or scaling, and
   upsampling the point cloud within the Lidar sensor data of the combined image to match a spatial resolution of color information of the camera sensor data of the combined image, wherein
   the determining of the combined image is based on the transformed point cloud.

2. The method according to claim 1 further comprising: compensating for the egomotion of the vehicle in the determination of the combined image.

3. The method according to claim 1, wherein
the transforming of the point cloud transposes at least a part of the point cloud to an estimated position of the part of the point cloud at a time a corresponding camera image of the camera sensor data is taken based on the information related to the motion.

4. The method according to claim 1, further comprising:
performing a time synchronization between the camera sensor data and the Lidar sensor data, wherein the determining of the combined image is further based on the time synchronization between the camera sensor data and the Lidar sensor data.

5. The method according to claim 4, wherein
the obtaining of the camera sensor data of the camera of the vehicle is triggered based on the Lidar sensor.

6. The method according to claim 5, wherein
the triggering of the obtaining of the camera sensor data is based on a rotation angle of the Lidar sensor.

7. The method according to claim 6, wherein
the rotation angle of the Lidar sensor corresponds to a rotation angle when the Lidar completes or commences a recording of a point cloud.

8. The method according to claim 1, wherein
the determining of the combined image comprises assigning a distance value or a depth value to pixels of the combined image.

9. The method according to claim 1, wherein
the determining of the combined image comprises overlaying depth information of the Lidar sensor data onto an image constructed from the camera sensor data.

10. A computer product comprising a non-transitory computer readable medium having program code for performing the method according to claim 1, when the program code is executed on a computer, a processor, or in a programmable hardware component.

11. An apparatus for a vehicle, the apparatus comprising:
   at least one interface configured to communicate with a camera of the vehicle and to communicate with a Lidar sensor of the vehicle; and
   a processing module configured to:
      obtain camera sensor data of the camera,
      obtain Lidar sensor data of the Lidar sensor, the Lidar sensor data comprising a point cloud;
      determine information related to a motion of the vehicle,
      determine a combined image of the camera sensor data and the Lidar sensor data based on the information related to the motion of the vehicle;
      transform the point cloud within the Lidar sensor data based on the information related to the motion,
      determine information related to one or more edges within the camera sensor data and information related to one or more intensity discontinuities within the Lidar sensor data;
      determine a mismatch of an overlay of the one or more edges within the camera sensor data and the one or more intensity discontinuities within the Lidar sensor data;
      reduce the mismatch of the overlay by transforming at least one of the Lidar sensor data or the camera sensor via shifting, rotating, translating, and/or scaling, and
      upsampling the point cloud within the Lidar sensor data of the combined image to match a spatial resolution of color information of the camera sensor data of the combined image, wherein the determining of the combined image is based on the transformed point cloud.

12. A vehicle comprising an apparatus according to claim 11.

13. A method for a vehicle, the method comprising:
obtaining camera sensor data of a camera of the vehicle;
obtaining Lidar sensor data of a Lidar sensor of the vehicle, the Lidar sensor data comprising a point cloud;
determining information related to a motion of the vehicle;
determining a combined image of the camera sensor data and the Lidar sensor data based on the information related to the motion of the vehicle;
transforming the point cloud within the Lidar sensor data based on the information related to the motion, and
upsampling the point cloud within the Lidar sensor data of the combined image to match a spatial resolution of color information of the camera sensor data of the combined image, wherein
the determining of the combined image is based on the transformed point cloud.

14. The method according to claim 13, wherein the upsampling further comprises:
determining a new distance value for each pixel of color information of the combined information, wherein
the new distance value is not found in the Lidar sensor data.

15. The method according to claim 5, wherein
the triggering of the obtaining of the camera sensor data occurs when a direction, of a plurality of directions through which the Lidar sensor is rotating, matches a direction that the camera sensor is facing.

16. The method according to claim 13, further comprising:
determining information related to one or more edges within the camera sensor data and information related to one or more intensity discontinuities within the Lidar sensor data;
determining a mismatch of an overlay of the one or more edges within the camera sensor data and the one or more intensity discontinuities within the Lidar sensor data; and
reducing the mismatch of the overlay by transforming at least one of the Lidar sensor data or the camera sensor via shifting, rotating, translating, and/or scaling.

17. The method according to claim 16, further comprising:
determining a calibration of the camera sensor data and of the Lidar sensor data based on the information related to the one or more edges and based on the information related to the one or more intensity discontinuities, wherein the determining of the combined image is based on the calibration of the camera sensor data and of the Lidar sensor data.

18. The method according to claim 16, wherein
the determining of the information related the one or more edges and of the information related to the one or more intensity discontinuities is performed while the vehicle is in motion.

19. The method according to claim 17, wherein
the determining of the information related the one or more edges and of the information related to the one or more intensity discontinuities is performed while the vehicle is in motion.

\* \* \* \* \*